5689X
T. MILLER.
Plow.
Patented Oct 23. 1829.
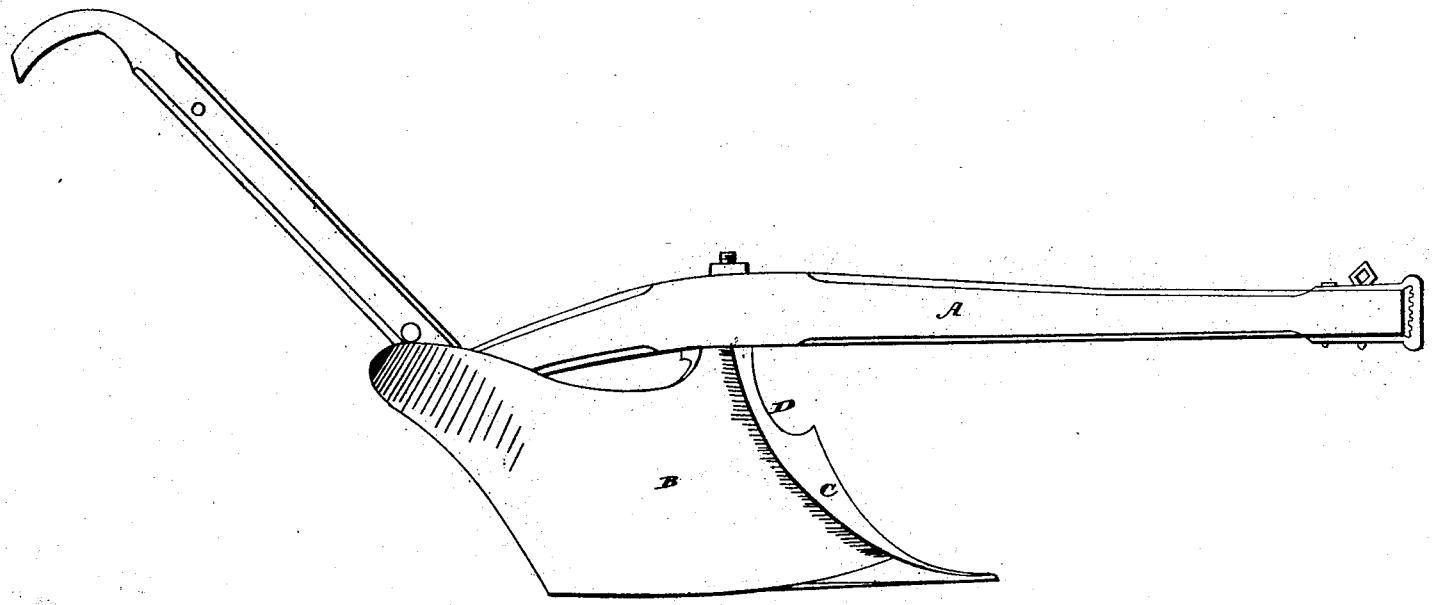

MISSING PAGE TEMPORARY NOTICE

PATENT # 5689X FOR ISSUE DATE 10-23-1829

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

All text